(12) United States Patent
Parmer et al.

(10) Patent No.: US 10,241,911 B2
(45) Date of Patent: Mar. 26, 2019

(54) MODIFICATION OF MULTIPLE LINES OF CACHE CHUNK BEFORE INVALIDATION OF LINES

(71) Applicant: HEWLETT PACKARD ENTERPRISE DEVELOPMENT LP, Houston, TX (US)

(72) Inventors: Gabriel Parmer, Palo Alto, CA (US); Paolo Faraboschi, Palo Alto, CA (US); Dejan S Milojicic, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 269 days.

(21) Appl. No.: 15/246,136

(22) Filed: Aug. 24, 2016

(65) Prior Publication Data

US 2018/0060233 A1    Mar. 1, 2018

(51) Int. Cl.
*G06F 12/0808*    (2016.01)
*G06F 12/0831*    (2016.01)
*G06F 12/0811*    (2016.01)

(52) U.S. Cl.
CPC ...... *G06F 12/0808* (2013.01); *G06F 12/0811* (2013.01); *G06F 12/0831* (2013.01); *G06F 2212/283* (2013.01); *G06F 2212/621* (2013.01)

(58) Field of Classification Search
CPC .. G06F 12/0808; G06F 12/0831; G06F 3/067; G06F 3/065; G06F 12/0811; G06F 3/0619; G06F 2212/621; G06F 2212/283
See application file for complete search history.

(56) References Cited

U.S. PATENT DOCUMENTS

| | | | |
|---|---|---|---|
| 6,678,799 B2 | 1/2004 | Ang | |
| 7,389,389 B2 | 6/2008 | Gharachorloo et al. | |
| 7,747,822 B1 | 6/2010 | Favor et al. | |
| 7,877,549 B1 | 1/2011 | Panwar et al. | |
| 9,218,289 B2 * | 12/2015 | Rychlik | G06F 12/0815 |

OTHER PUBLICATIONS

Ashby, T.J. et al., "Software-Based Cache Coherence with Hardware-Assisted Selective Self Invalidations Using Bloom Filters", (Research Paper), Apr. 2011, 12 pages.
Konththanassis et al; Lazy Release Consistency for Hardware-Coherent Multiprocessors; Department of Computer Science, University of Rochester; Dec. 1994.

* cited by examiner

*Primary Examiner* — Michael Alsip
(74) *Attorney, Agent, or Firm* — Hewlett Packard Enterprise Patent Department

(57) ABSTRACT

Examples described herein relate to caching in a system with multiple nodes sharing a globally addressable memory. The globally addressable memory includes multiple windows that each include multiple chunks. Each node of a set of the nodes includes a cache that is associated with one of the windows. One of the nodes includes write access to one of the chunks of the window. The other nodes include read access to the chunk. The node with write access further includes a copy of the chunk in its cache and modifies multiple lines of the chunk copy. After a first line of the chunk copy is modified, a notification is sent to the other nodes that the chunk should be marked dirty. After multiple lines are modified, an invalidation message is sent for each of the modified lines of the set of the nodes.

9 Claims, 3 Drawing Sheets

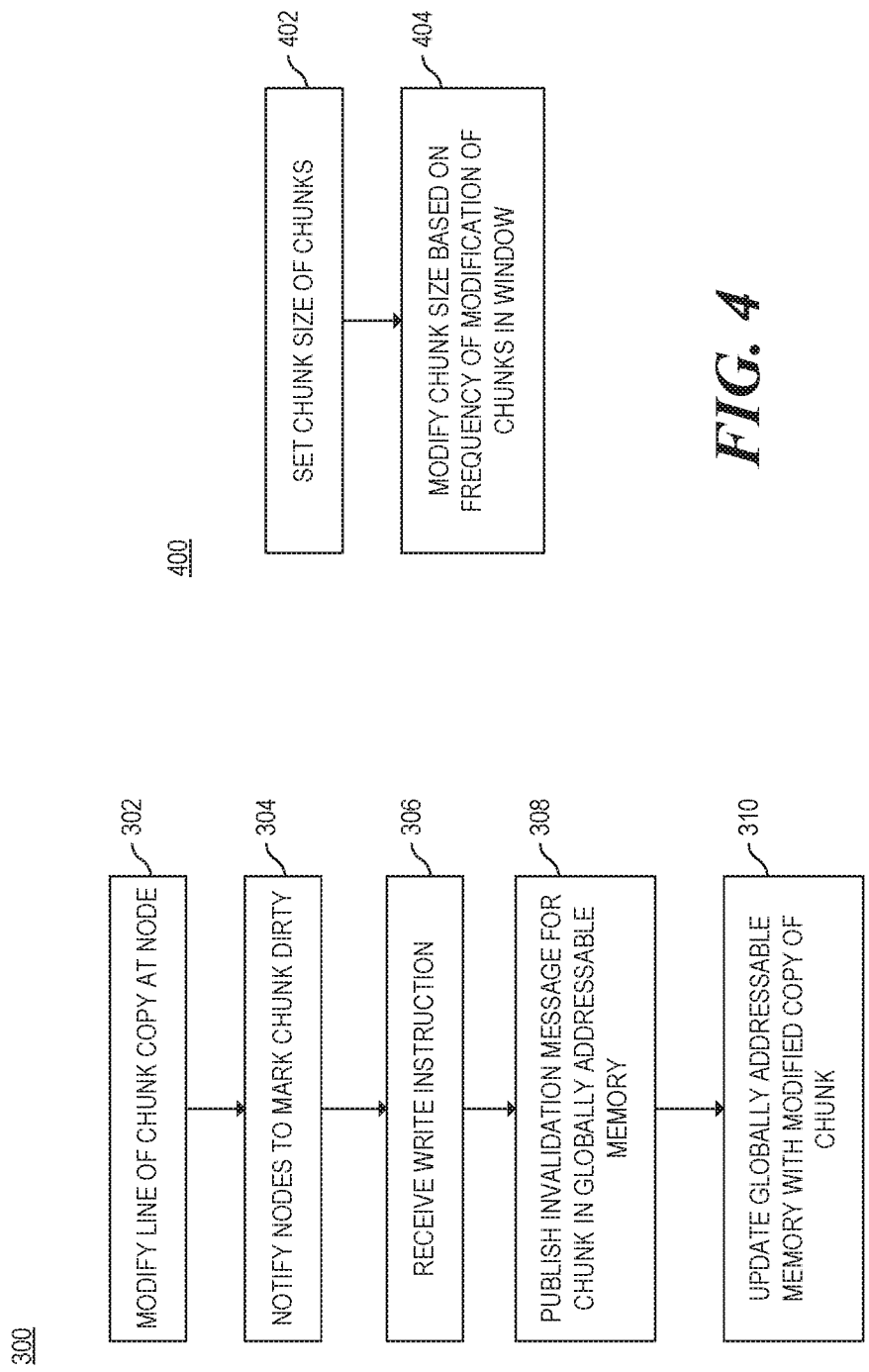

MODIFICATION OF MULTIPLE LINES OF CACHE CHUNK BEFORE INVALIDATION OF LINES

BACKGROUND

Several processing nodes may share a common memory resource and may independently maintain local caches that store data frequently accessed from the commonly shared memory resource. For purposes of maintaining consistency of the data that is stored in the local caches, the processing nodes may use a cache coherence mechanism.

BRIEF DESCRIPTION OF THE DRAWINGS

The following detailed description references the drawings, wherein:

FIG. 3 is a flowchart of a method capable of marking a chunk as dirty when a line in cache is written and invalidating multiple lines of the chunk after a delay, according to an example; and FIG. 4 is a flowchart of a method for modifying a chunk size in a memory architecture based on frequency of modification of the chunk in a window, according to an example.

Figure 1:
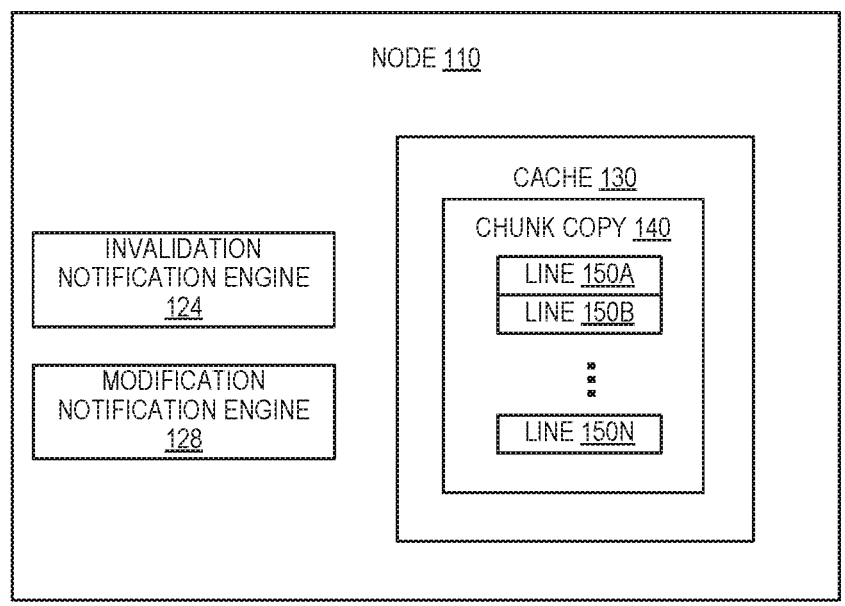
FIG. 1 is a block diagram of a node capable of using a delayed coherency protocol in a computing system, according to an example.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

A multi-node computer system may have independent processing nodes that share a globally addressable memory (e.g., a volatile or non-volatile memory). The processing nodes may contain local caches to store data frequently accessed from the globally accessible memory, and the computer system may employ a cache coherence system for purposes of maintaining consistency of the data stored in these local caches. As the number of nodes and the size of the computing system grows, overhead on maintaining consistency of data stored in the local caches can also grow. As such, rack-scale computers can create scalability challenges.

Accordingly, approaches provided herein relate to striking a balance between maintaining relationship guarantees between the globally addressable memory and caches at nodes. A coherence protocol can be implemented that accepts temporarily non-coherent caches and uses a combination of executable instructions and hardware to achieve high scalability while still having implementation simplicity.

As used herein, a "node" in a computing system is a set of cores that are locally coherent. In certain examples, a node can have a cache that is not coherent with a globally addressable memory shared between the nodes in the computing system. As used herein, "globally addressable memory" is a memory that is addressable by the nodes through a shared namespace between nodes. There can be a delayed coherency between the nodes' caches and the globally addressable memory.

The globally addressable memory can be broken into windows that each include multiple chunks. In certain examples, nodes can be associated with windows. As used herein, a "window" is a subset of the globally addressable memory that can be monitored by a node. In one example, if a node is associated with a window, the node can monitor memory information associated with the window. For example, a node can subscribe to memory information associated with a window. Such memory information can include monitoring which chunks in the window are considered dirty, invalidation messages, chunk size information, etc. associated with the window.

The windows can each be broken into "chunks" of a determined size. Chunks can each have multiple cache lines. Cache lines can be blocks of memory of a pre-determined size. For scalability purposes, coherence between the nodes and globally addressable memory is tracked at the granularity of a chunk. Moreover, the protocol used to perform the delayed cache coherence between nodes and the globally addressable memory can be simplified using a combination of software instructions that can be executed and hardware. In one example, the software can be responsible for cleaning dirty cache lines. In another example, the hardware can be responsible for invalidating stale copies cached in other nodes' caches.

A computing system can include multiple nodes. Nodes may be on separate physical servers or multiple nodes may be included on a physical server. The nodes can monitor specific windows of the globally addressable memory. In the system, at a particular time, one of the nodes can have write access to a chunk in the window. At that time, the other nodes monitoring the window can have read access to the chunk. In various examples, a producer-consumer model, a concurrent read exclusive write model, a publisher subscriber model, etc. can implemented for the usage of chunks.

The writer node can have a copy of the chunk in its cache (e.g., by retrieving it from the globally addressable memory). The writer node can modify one of the lines of the chunk in the chunk copy in the writer node's cache. The writer node can then notify the other nodes monitoring the window associated with the chunk that the chunk is dirty. The writer node can continue to modify other lines of the chunk. At this point in time, the copy of the chunk is not consistent with the globally addressable memory. There can be a delay in the consistency. As such, multiple other lines of the chunk copy in the writer node's cache can be modified. Since the chunk is already regarded as dirty, additional notifications of marking the chunk dirty are not needed. After multiple lines are modified, the writer node can publish an invalidation message for each of the modified lines of the chunk copy to the other nodes that subscribe to the same chunk in the globally addressable memory.

Referring now to the drawings, FIG. 1 is a block diagram of a node capable of using a delayed coherency protocol in a computing system, according to an example. In the example of FIG. 1, node 110 can include an invalidation notification engine 124, a modification notification engine 128, and cache 130. The cache 130 can include a copy of a chunk, or chunk copy 140, that includes a number of cache lines 150A, 150B-150N from a globally addressable memory that is shared by the node 110 and other nodes. In one example, node 110 can be considered a writer node in the computing system.

As noted above, the writer node 110 can have a copy of the chunk in its cache (e.g., by retrieving it from the globally addressable memory). The writer node 110 can modify one of the lines (e.g., line 150B) of the chunk in the chunk copy in the writer node's cache. The writer node 110 can then notify the other nodes monitoring a window associated with the chunk that the chunk is dirty using modification notification engine 128. In one example, the modification notification engine 128 can determine what other nodes subscribe to the window (which includes the chunk) and that information can be used to determine which nodes to send the information that the chunk has been modified and is considered dirty. In another example, the modification notification engine 128 can determine what other nodes monitor the chunk at a chunk level and use that information to send out messages that the chunk is dirty.

The writer node 110 can continue to modify other lines (e.g., others of lines 150A-150N) of the chunk. At this point in time, the copy of the chunk is not consistent with the globally addressable memory. There can be a delay in the consistency. Since the chunk is already regarded as dirty, additional notifications of marking the chunk dirty are not needed. After multiple lines are modified, the writer node 110 can publish an invalidation message for each of the modified lines of the chunk copy to the other nodes that subscribe to the same chunk in the globally addressable memory using an invalidation notification engine 124.

Figure 2:
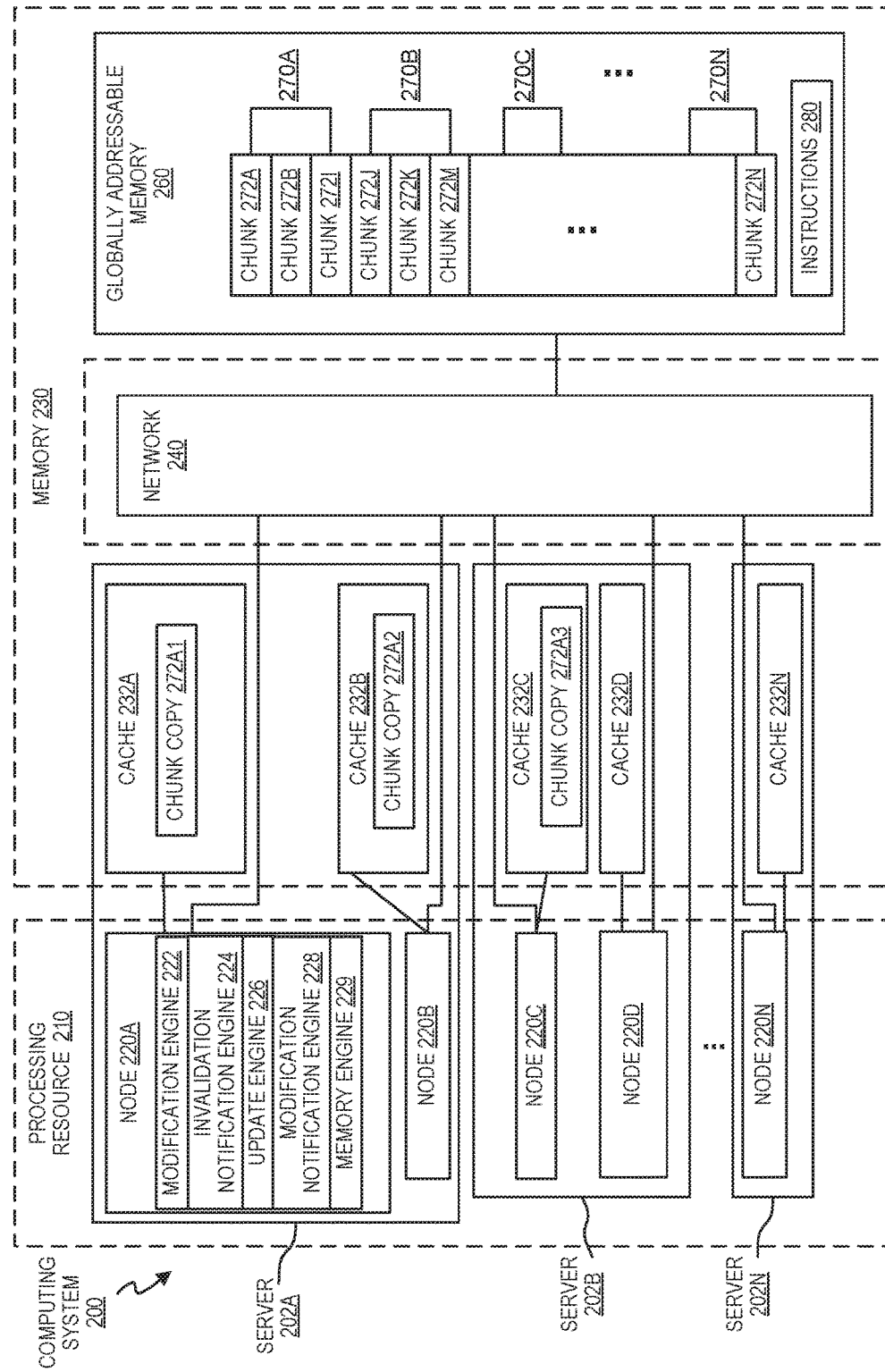
FIG. 2 is a block diagram of a computing system including nodes that can implement a delayed cache coherency protocol, according to one example.

The information used for cache coherency management can be kept at a chipset or engine associated with the respective nodes. Similarly, in one example, the node can keep track locally whether it is a writer for a particular chunk. In one example, the engines 124, 128 can be part of a chipset associated with node 110. Higher level instructions can further manage writers for the chunks. FIG. 2 further describes the system and details other aspects of nodes in the system.

FIG. 2 is a block diagram of a computing system including nodes that can implement a delayed cache coherency protocol, according to one example. The system 200 can include multiple nodes 220A, 220B, 220C, 220D-220N. Multiple nodes can be implemented on a single physical server (e.g., server 202A or 202B) or a single node may be implemented on a single physical server 202N. Nodes 220 can be considered part of a processing resource 210 of the system 200. Moreover, caches 232A, 232B, 232C, 232D-232N associated with respective nodes 220 can include information cached from globally addressable memory 260 accessed via a network 240. The caches 232, memory network 240, and globally addressable memory 260 can be considered part of a memory 230 subsystem of the system 200. In some examples, a node, for example, node 220A can include a modification engine 222, an invalidation notification engine 224, an update engine 226, a modification notification engine 228, and a memory engine 229. Similar engines 124, 128, 222, 224, 226, 228, 229 can be implemented as part of chip sets and/or other logic for the other nodes.

A node 220 in the system 200 is a set of cores that are locally coherent. In some examples, nodes 220A-220N can represent a processing resource 210 of the system 200. A given processing node 220 may be formed from one or many of a microcontroller, a microprocessor, central processing unit (CPU) core, an application-specific integrated circuit (ASIC), a field programmable gate array (FPGA), and/or the like depending on implementation. The processing resource 210 may retrieve and/or execute instructions. In some implementations, the processing resource 210 may be heterogeneous in nature, in that the processing resource 210 includes CPU cores (and/or other types of processing resource) that differ in instruction set architectures supported, performance characteristics, or other aspects.

For illustrative purposes, nodes 220 are separated from their respective caches 232 to show the difference between processing resources 210 and memory 230, however, it is intended that the caches 232 be considered part of their respective nodes 220.

The processing nodes 220, in accordance with example implementations, are independent, are interconnected by an intra-node network 240, and share a globally addressable memory 260 layer. Each of the nodes 220 may communicate with each other by way of a fabric, such as a network 240. It should be understood that more or less nodes 220 and servers 202 may be employed than is shown and described with respect to the example illustrated in FIG. 2. For the particular example depicted in FIG. 2, the globally addressable memory layer can be formed from memories that may be formed from sets of Non-Volatile Random Access Memory (NVRAM) devices, for example. However, the globally addressable memory 260 layer may be formed from other non-volatile memory devices, as well as volatile memory devices, such as Dynamic Random Access Memory (DRAM) devices, in accordance with further example implementations. For example implementations in which the globally addressable memory layer is formed from NVRAM devices, a given set of NVRAM devices may be formed from one or multiple sets of NVRAM modules.

In accordance with example implementations, each processing node 220 may contain one or more caches and engines to control communications between the respective node's last-level cache (LLC) and the intra-node network 240 (e.g., to communicate with other nodes. Moreover, in accordance with example implementations, each processing node 220 may contain multiple levels of caches. For example, the caches 232 for a given processing node 220 may include a level one (L1) cache, a level two (L2) cache, a level three (L3) cache, etc. In various examples, different nodes may include varying levels of cache. As noted, these caches 232 are locally coherent to their respective nodes 220.

The memory engine 229 can be used to communicate with the globally addressable memory 260. The memory engine 229 can be part of a fabric control component of the computing system 200 to facilitate communications between nodes and/or the globally addressable memory 260 via network 240.

The globally addressable memory 260 of the computing system 200 can include memory that is stored on individual servers that also include nodes and/or on other resources. For example, the globally addressable memory 260 may include volatile memory (e.g., DRAM), and each portion of the memory may be coupled to or integrated with a respective node 220 (e.g., a node may include both a processing portion and local memory in an integrated package). The globally addressable memory 260 may also be formed from non-volatile memory devices (e.g., flash memory devices, phase-change memory devices, spin-transfer torque memory devices, resistive random-access memory or memristive devices, etc.) and may be accessible to all nodes 220, by way of the network 240 fabric for example. In some examples, a memory broker may be used to manage the physical address ranges of the global memory layer.

As noted, the memory engine 229 can communicate with the globally addressable memory 260 of the computing system 200. The globally addressable memory 260 is further accessible by a plurality of other nodes in the computing system 200, for example, nodes 220B, 220C, 220D-220N. In some examples, a subset of the available nodes in the computing system 200 can have access to the globally addressable memory 260, in other examples, each of the nodes 220A-220N can have access to the globally addressable memory 260. In some examples, the memory engine 229 can retrieve and store information into the globally addressable memory 260 in traditional approaches with the augmentation of the caching scheme. For example, the memory engine 229 can pull information from the globally addressable memory 260 using an address. As noted, in some examples, the transaction can be through a memory broker.

As noted, the globally addressable memory 260 can be partitioned into windows 270A, 270B, 270C-270N. The windows 270 can be of a predetermined size or be variable and controlled by a higher level instruction set. In certain examples, nodes 220 can each be associated with one or multiple windows 270. A "window" is a subset of the globally addressable memory 260 that can be monitored by a node 220. In some examples, a node 220 can still access information in a window, for example, window 270B, that the node 220 does not monitor. In one example, if a node 220A is associated with a window 270A, the node 220A can monitor memory information associated with the window 270A. For example, the node 220A can subscribe to memory information associated with a window 270A. Such memory information can include monitoring which chunks (e.g., chunks 272A, 272B-272I) in the window 270A are considered dirty, invalidation messages, chunk size information, etc. associated with the window 270A. As shown, a number of chunks 272 can be associated with each window 270. For example, window 270A may be associated with chunks 272A-272I, window 270B may be associated with chunks 272J, 272K-272M, window 270C may be associated with another set of chunks, and so forth to window 270N and chunk 272N.

In one example, node 220A is part of a set of nodes including node 220A, 220B, and 220C that include caches 232A, 232B, 232C associated with window 270A. This is an example scenario and it is contemplated that more or less nodes can monitor the same window. In this example, node 220A has write access to the chunk 272A. The remaining nodes of the set, node 220B and node 220C have read access to the chunk 272A. One of various implementations can be used for determining what node is the writer and which nodes have read access, for example, a producer consumer model, a publisher subscriber model, a concurrent read exclusive write (CREW) model, etc. In some examples, having write access also means that the node 220A has read access as well. In one example scenario, nodes 220A, 220B, and 220C each retrieve the chunk 272A from the globally addressable memory 260 and have a chunk copy 272A1, 272A2, 272A3.

A modification engine 222 can be used to modify a first line of chunk copy 272A1. The chunk copy 272A1 can be modified as part of normal processing of information in a local coherent cache. As used herein, "first line" of the chunk copy 272A1 means the first line of the chunk copy 272A1 that is modified and can be located at one of various lines in the chunk copy 272A1.

When the first line is modified, a modification notification engine 228 causes notification to the other nodes in the set (in this example, nodes 220B and 220C) that the chunk 272A is to be marked dirty. This means that the other nodes 220B, 220C in the set can no longer trust that their respective chunk copies 272A2, 272A3 are up to date. The notification can be via the network 240, for example, using a publisher subscriber model or other notification scheme. Each of the nodes 220 can include information about what monitored chunks are dirty (e.g., using 1 bit per chunk). The information can be kept at a chipset or engine associated with the respective nodes 220. Similarly, in one example, each node can keep track locally whether it is a writer for a particular chunk. Higher level instructions can further manage writers for the chunks. In one example, the engines 222, 224, 226, 228, 229 can be part of a chipset associated with a node 220A.

Instead of updating the globally addressable memory 260 with the changes immediately, a delayed approach can be taken. As such, the modification engine 222 can further modify one or multiple other lines of the chunk copy 272A1 and/or remodify some of the lines in the chunk copy 272A1.

Moreover, after the plurality of lines are modified, the update engine 226 can update the chunk 272A. The chunk 272A can be updated, for example, by writing the modified lines to the chunk 272A or re-writing the whole chunk 272A.

Further, after the plurality of the lines are modified, the invalidation notification engine 224 can publish an invalidation message for the modified first line and the modified other lines to the set of nodes 220B, 220C. With this approach, the other nodes 220B, 220C know that the chunk is dirty, but the information in the globally addressable memory 260 is not up to date. However, once the update engine 226 updates the chunk 272A and invalidations are sent out, a delayed consistency is achieved. In one example, hardware logic including a port on the node 220 can be used to trigger batch invalidation messages to the other nodes. Once the invalidation messages are triggered, the associated dirty bit for the chunk 272A can be cleared so it can be reused upon further modifications. In some examples, invalidations can be sent out by line modified. In other examples, invalidations can be sent out in write sets. As used herein, a "write set" is a set of the cache lines that are treated together. A write set is smaller than a chunk, but includes more than one cache line. Further, in one example, if enough lines of a chunk are modified, invalidations can be sent for the chunk. In another example, the default action may be to invalidate cache lines using the whole chunk.

Instructions 280 can be executed by the nodes 220 to facilitate management of the caches. The instructions 280 can be part of a higher level instruction set. Examples of higher level instruction sets include an operating system, a library, and middleware. In one example, an operating system is software that can be executed by a processing resource 210 that supports a computer's basic functions such as scheduling tasks, executing applications, and controlling peripherals. In another example, middleware is a software that can be executed by a processing resource 210 to act as a bridge between an operating system or database and applications. A library is a collection of software packages that can be made generally available to other programs executed on the computing system 200 to use.

The higher level instruction set can be used to coordinate between nodes 220. For example, the instructions 280 can be executed to manage windows and/or chunk sizes. In one example, the memory engine 229 can be used to set the windows 270 that node 220A monitors. In alternative examples, the memory engine 229 may determine the windows 270 that it follows on its own (e.g., based on usage).

Moreover, in some example, the memory engine 229 can also control a size of the range of one or more windows that the node 220 follows. The higher level instruction set may control the windows monitored and ranges or the windows monitored and ranges can be determined at a lower level by the memory engine 229 (e.g., via monitoring a frequency of usage). The control over the set of nodes that participate in coherency of a particular window enables the computing system 200 to control the overhead of coherency (e.g., asymptotic number of invalidation messages sent to nodes).

In one example, the chunk size can be used to control the number of invalidation messages, and thus interconnect overhead. In some examples, invalidation messages can be sent for the entire chunk. Thus larger chunk sizes can mean that many cache line modifications can be amortized into a single invalidation message. However, if few of the cache lines in a chunk are modified, large chunk sizes may cause more cache-lines to be invalidated that were not modified. As such, chunk size can be chosen to balance this trade-off.

In one example, instructions 280 can be executed by node 220A to cause the update engine 226 to publish the chunk copy 272A1 to the globally addressable memory 260. Accordingly, the instructions 280 can be used to guarantee to the hardware that the writer node 220A is the only node with write access to the chunk before invalidation messages are published. In some examples, the writer node does not change frequently and the writer node is still considered the writer after the invalidations are sent out.

When a reader node 220B receives the invalidation, the reader node 220B can pull the updated chunk 272A (or corresponding modified lines) from the globally addressable memory 260. This can occur when the lines are invalidated or based on another trigger, for example, the next time the cache line is accessed. In some examples, when a reader node 220B attempts to read a chunk marked dirty before the invalidations are sent out, the software executing associated with the instructions 280 can be notified. The software can then cause the invalidation notification engine 224 to write the chunk back to the globally addressable memory 260 and send out invalidation messages.

In another example, the instructions 280 can be executed to control a size of the chunks in a window via a programmable logic port associated with a node (e.g., using memory engine 229). In one example, modifications to chunks in windows can be tracked (e.g., counted, counted over a period of time, etc.). As such, frequency of modification of chunks in a window can be monitored. To control overhead, the size of the chunks in a window can be varied. In one example, if the modification of chunks in the window is frequent, the chunk size can be modified to be larger to limit the amount of overhead associated with modifications to the chunks. In another example, if the modification of chunks is sparse in a window, the chunk size can be varied to be smaller because overhead would be less of an issue and performance may be a larger consideration. In some examples, thresholds can be used to map frequency of modification of chunks to chunk sizes. This control allows for modifications of a chunk copy to become visible via triggering invalidations, which enables invalidation traffic to be amortized across many modifications, which can reduce overhead.

In one example, the instructions 280 are part of an operating system running on the computing system 200. The operating system can include access to the programmable ports associated with the individual nodes. As such, in one example, the operating system can have access to control the usage of one or more of the engines 222, 224, 226, 228, 229.

Moreover, the operating system can include access and visibility to knowing when a node has sent invalidation messages. As such, the operating system can know when invalidation of a dirty chunk is complete and may transfer which node has write access to the chunk. In some examples, the operating system can use this information to guarantee that no two nodes can write to the same chunk before invalidations are sent out. Similar operations can be performed by middleware or a library.

In some examples, some of the nodes in the computing system 200 can be part of the delayed consistency protocol for a window described herein while other nodes of the system may not be. This information may be kept for the individual nodes 220 so the individual nodes know which windows the respective node follows. Further, this information can be kept at other nodes monitoring the same window, so writing nodes know which nodes to send invalidations and notifications of whether a chunk is clean or dirty.

In one example, the node knows which windows it subscribes to. In this example, the writer node can publish to the network 240 information addressed to the window. The nodes monitoring that window can receive/look at the information.

The approaches described herein describe a release/acquire consistency approach that relies on per-cache-line tracking of reader and writer sets, coordination of sending invalidations with acquire actions, and lock releases that ensure that all pending stores are flushed to memory. Further, the delayed consistency approach described herein avoids the state required to track per-cache-line data, and the coherency traffic between nodes on modification and access.

In some examples, a message passing interface or parallel virtual machine approach can be used to coordinate communications in the network 240. Network hardware can be implemented using a variety of different approaches. For example, switches, interconnects, such as photonic interconnects, buses, etc. may be used to connect nodes. Other mediums can be used.

The engines 222, 224, 226, 228, 229 include hardware and/or combinations of hardware and programming to perform functions provided herein. Moreover, functionality attributed to a particular engine may also be implemented using another engine. As noted, the engines 222, 224, 226, 228, 229 can be implemented in a chipset associated with a node.

In some examples, the instructions 280 can be stored on a non-transitory machine readable medium (not shown). Such media can be used to transport the instructions to the computing system 200. Further, the globally addressable memory 260 can be implemented using a tangible non-transitory machine readable medium.

FIG. 3 is a flowchart of a method capable of marking a chunk as dirty when a line in cache is written and invalidating multiple lines of the chunk after a delay, according to an example. Although execution of method 300 is described below with reference to computing system 200, other suitable components for execution of method 300 can be utilized (e.g., using node 110). Additionally, the components for executing the method 300 may be spread among multiple devices.

As noted above, computing system 200 includes multiple nodes 220 that can be communicatively coupled to a globally addressable memory 260. The globally addressable memory 260 includes a number of windows 270 each including chunks 272. A set of the nodes (e.g., a number of the nodes that is less than the total number of nodes in the computing system 200) each include a cache associated with one of the windows (e.g., window 270A). The nodes can monitor and be associated with other windows as well. Further, a different set of the nodes can monitor and/or be associated with another window. Moreover, the different set can include some of the nodes from the original set. As noted above, the number of the nodes in the set monitoring the window can be changed.

One of the nodes, for example, node 220A, has write access to one of the chunks 272A of the window 270A. As noted above, a set of instructions 280 (e.g., an operating system, a library, a middleware, etc.) can manage which of the nodes 220 have write access to which chunks. In one example, only one of the nodes has write access. The remaining nodes of the set have read access. The node 220A with write access can retrieve a chunk copy 272A1 from the globally addressable memory 260. Other nodes with read access can similarly have respective copies of the chunk in their caches.

In certain examples, the instruction set can be used to change the number of nodes monitoring each window. The instruction set may do this, for example, based on workload of the computing system 200.

At 302 the modification engine 222 modifies the chunk copy 272A1. The modification can be part of usage of the information. For example, software instructions 280 can be executed to cause the information to be updated based on user input or based on other information, an operation can be performed, etc. The modification engine 222 can start by modifying one of the lines of the chunk copy 272A1.

At this point, the chunk 272A should be marked dirty because the chunk copy 272A1 has been modified and node 220A has write access to the chunk. As such, modification notification engine 228 can send a message to each of the nodes monitoring the window that the chunk 272A is to be marked dirty (304). When the chunk 272A is marked dirty, the reader nodes can no longer trust the information in the chunk 272A. The modification engine 222 can modify multiple lines of the chunk copy 272A1; however, additional messages to mark the chunk dirty are not needed.

At 306, a write instruction can be received at the node 220A from the execution of the instructions 280. As noted above, the instructions 280 can be part of a higher level instruction set, for example, representing an operating system, a library, middleware, etc. The executable instructions can be responsible for causing publication of invalidation messages. This allows for simplifying the hardware while also making the system more scalable. Further, in some examples, the instructions can be implemented to guarantee that the node 220A is the only node with write access to the chunk 272A before the globally addressable memory 260 is updated.

At 308, the invalidation notification engine 224 can respond to the write instruction by publishing an invalidation message for each of the modified lines to the reader nodes. In various examples, publishing the invalidation message can include invalidating each of the modified lines separately, invalidating a superset of the modified lines (e.g., a write set or the whole chunk), or similar action.

At 310, the globally addressable memory 260 can be updated with the modified copy of the chunk. Various traditional approaches can be used to write the information back for the chunk. In some examples, a different chunk writer can be selected for the chunk. In other examples, the node can be the exclusive writer for the chunk for an extended period of time. This can be beneficial, for example, in certain specific use models, such as CREW.

In one example, from the software instructions perspective, nodes that modify the globally addressable memory 260 must commit their modifications to the globally addressable memory (e.g., via software support, flushing the cache lines, etc.), and trigger the invalidations to be transmitted to other nodes in the set monitoring the window. The reader nodes reading the globally addressable memory 260 will cache results until the delayed consistency notifies the nodes of the updates through invalidations. At this point, modified data can be guaranteed to be visible.

FIG. 4 is a flowchart of a method for modifying a chunk size in a memory architecture based on frequency of modification of the chunk in a window, according to an example. Although execution of method 400 is described below with reference to computing system 200, other suitable components for execution of method 400 can be utilized (e.g., using node 110). Additionally, the components for executing the method 400 may be spread among multiple devices.

As noted above, instructions 280 of computing system 200 can be executed to control a size of the chunks (e.g., chunks 272A-272I) in a window (e.g., window 270A) via a programmable logic port associated with a node (e.g., using memory engine 229). At 402, the instructions 280 can be executed by processing resource 210 to set a chunk size of the chunks 272A-272I using the memory engine 229. In some examples, the chunk size can be implemented to fit into the window size for each window (e.g., chunk size times the number of chunks equals the window size). The chunk size, window size, and/or number of chunks per window can be stored. In one example, the information can be stored in memory 230 and be accessible to the program associated with the instructions 280. In another example, the information can be stored in a chipset associated with the nodes 220.

In one example, modifications to chunks in windows can be tracked (e.g., counted, counted over a period of time, etc.). As such, frequency of modification of chunks in a window can be monitored. To control overhead, the size of the chunks in a window can be varied.

At 404, the memory engine 229 can be used to modify the chunk size based on a frequency of modification of the chunks associated with the window. This allows the computing system 200 to take into account distribution of modification of chunks into system performance and overhead management.

In one example, if the modification of chunks in the window is frequent, the chunk size can be modified to be larger to limit the amount of overhead associated with modifications to the chunks. In another example, if the modification of chunks is sparse in a window, the chunk size can be varied to be smaller because overhead would be less of an issue and performance may be a larger consideration. In some examples, thresholds can be used to map frequency of modification of chunks to chunk sizes to control overhead of coherency.

Similarly, the chunk size can be used to control the number of invalidation messages, and thus interconnect overhead. As noted, invalidation messages can be sent for the entire chunk. Thus larger chunk sizes can mean that many cache line modifications can be amortized into a single invalidation message. However, if few of the cache lines in a chunk are modified, large chunk sizes may cause more cache-lines to be invalidated that were not modified. As such, chunk size can be chosen to balance this trade-off.

What is claimed is:
1. A computing system comprising:
a plurality of nodes;

a globally addressable memory that is addressable by each of the nodes,
wherein the globally addressable memory includes a plurality of windows each including a plurality of chunks;
wherein a set of the nodes each include respective caches associated with one of the windows,
wherein a first one of the nodes has write access to one of the chunks of the one window,
wherein a remaining portion the set of the nodes have read access to the one chunk,
wherein the first one node further includes:
a copy of the one chunk in the respective cache of the first one node,
wherein a plurality of lines of the copy are modified;
a modification notification engine to, when a first line of the copy is modified, cause notification to the remaining portion that the one chunk should be marked dirty; and
an invalidation notification engine to, after the plurality of the lines are modified, publish an invalidation message for each of the modified lines to the set of the nodes; and an update engine and
instructions that, when executed by the first one node, causes the update engine to:
publish the copy of the one chunk to the globally addressable memory;
set the chunk size using a programmable hardware logic port; and
modify the chunk size based on a frequency of modification of the chunks associated with the one window,
wherein the instructions are part of a higher level instruction set comprising at least one of: an operating system, a library, and middleware.

2. The computing system of claim 1, wherein the instructions are further to ensure that the remaining portion of the nodes do not have write access to the one chunk until after the invalidation message is published.

3. The computing system of claim 1, wherein the instructions are further to: control a size of the windows via a programmable hardware logic port.

4. The computing system of claim 1, wherein the instructions are part of a higher level instruction set comprising at least one of: an operating system, a library, and a middleware, the instructions further to guarantee that the first one node is the only node with write access to the one chunk before the invalidation message is published.

5. The computing system of claim 1, wherein the modified lines are within a write-set of the chunk.

6. The computing system of claim 1, wherein a number of nodes in the set of the nodes is less than a total number of the nodes and wherein the invalidation notification engine is controlled by a set of instructions associated with an operating system running on the computing system and wherein the invalidation message is caused to be sent by execution of the instructions set, and wherein the operating system includes access to when the sending of the invalidation message is complete.

7. A method comprising:
by a computing system with a plurality of nodes communicatively coupled to a globally addressable memory that is addressable by each of the nodes,
wherein the globally addressable memory includes a plurality of windows each including a plurality of chunks,
wherein a set of the nodes each include respective caches associated with one of the windows,
wherein a first one of the nodes has write access to one of the chunks of the one window,
wherein a remaining portion of the set of the windows has read access to the one chunk,
modifying, by the first one node, a copy of the one chunk in the respective cache of the first one node, wherein a plurality of lines of the copy are modified;
causing notification, by the first one node, when a first one of the lines is modified, to the remaining portion that the one chunk is to be marked dirty;
receiving a write instruction at the first one node;
responsive to the write instruction, publishing, by the first one node, an invalidation message for each of the modified lines to the remaining portion of the set of the nodes;
updating the globally addressable memory with the modified copy of the one chunk;
executing, by the computing system, a higher level instruction set representing at least one of: an operating system, a library, and a middleware,
wherein the instruction set is to guarantee that the first one node is the only node with write access to the one chunk before the globally addressable memory is updated;
setting a chunk size of the chunks, by the higher level instruction set, using a programmable hardware logic port on the one node; and
modifying the chunk size based on a frequency of modification of the chunks associated with the one window.

8. The method of claim 7, further comprising:
changing a number of the nodes in the set of the nodes monitoring the one window.

9. A node of a computing system comprising:
a memory engine to communicate with a globally addressable memory of the computing system, wherein the globally addressable memory is further accessible by a plurality of other nodes in the computing system,
wherein the globally addressable memory includes a plurality of windows each including a plurality of chunks,
wherein the node is part of a set including the node and a plurality of the other nodes that include respective caches associated with one of the windows,
wherein the other nodes in the set have read access to one of the chunks,
wherein the node has write access to the one chunk;
a node cache to include a copy of the one chunk;
a modification engine to modify a first line of the copy;
a modification notification engine to cause notification to the other nodes in the set that the one chunk is to be marked dirty in response to the modification of the first line of the copy,
wherein the modification engine is further to modify another plurality of lines of the copy; and
an invalidation notification engine to, after the other plurality of lines of the copy are modified, to publish an invalidation message for the modified first line and the modified other lines to the set of the nodes,
wherein a higher level instruction set controls a size of the chunks via a programmable hardware logic port,
wherein the higher level instruction set represents at least one of: an operating system, a library, and a middleware,
wherein the higher level instruction set is further to:

guarantee that the node is an only node with write access to the one chunk before the invalidation message is published,
set the chunk size using the programmable hardware logic port on the one node, and
modify the chunk size based on a frequency of modification of the chunks associated with the one window.

* * * * *